Figure 1:
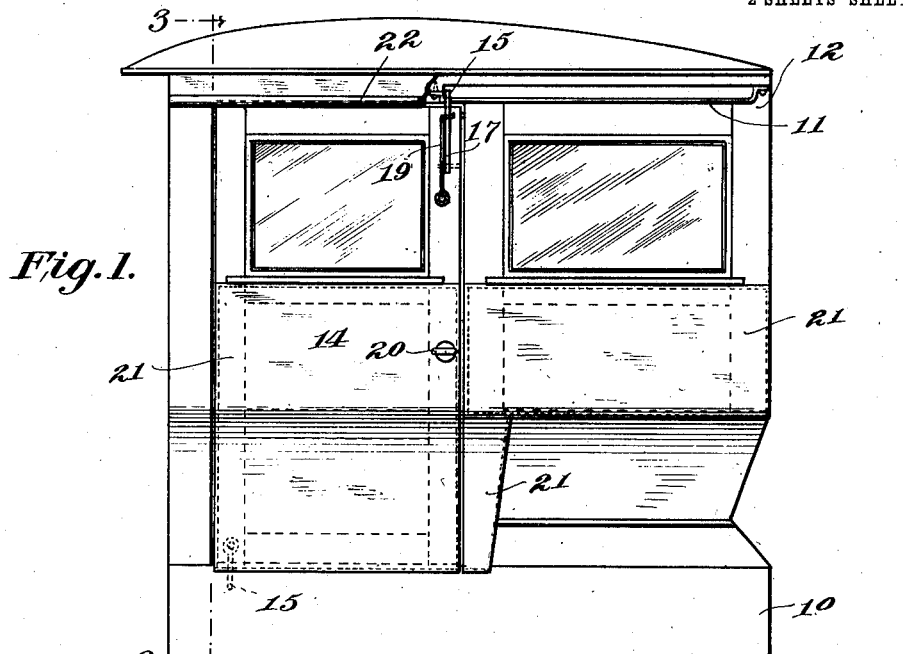

W. W. ELLIS.
SLIDING VEHICLE DOOR.
APPLICATION FILED APR. 11, 1911.

1,055,969.

Patented Mar. 11, 1913.

2 SHEETS—SHEET 1.

Inventor
Wilbur W. Ellis
By Victor J. Evans
Attorney

Witnesses

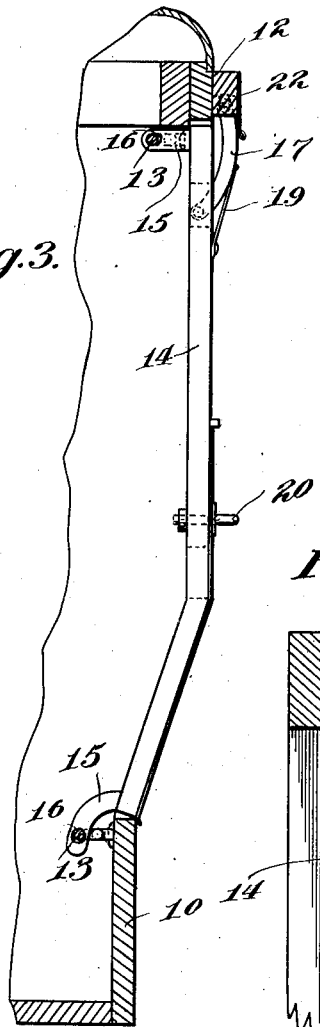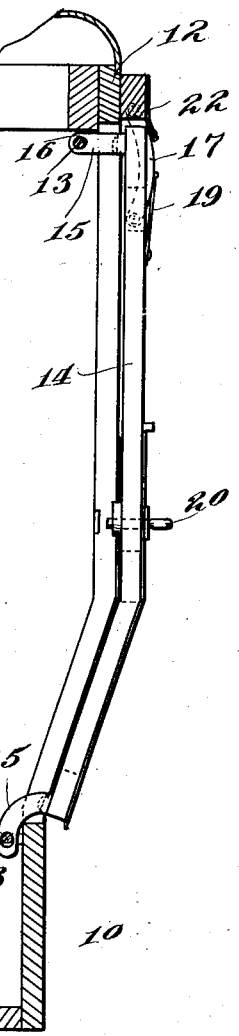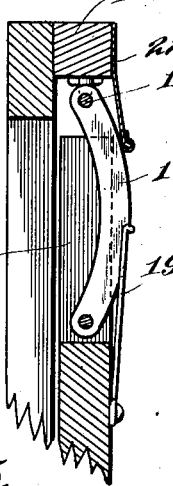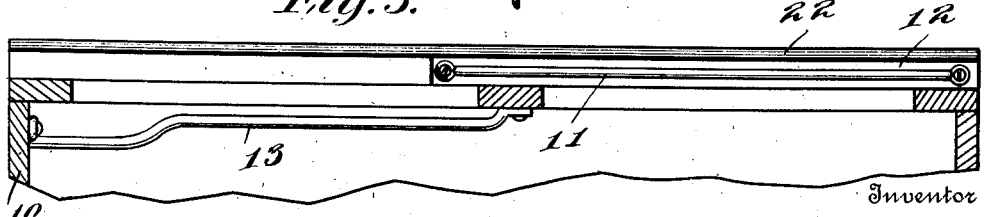

UNITED STATES PATENT OFFICE.

WILBUR W. ELLIS, OF WASHINGTON COURT HOUSE, OHIO.

SLIDING VEHICLE-DOOR.

1,055,969.

Specification of Letters Patent. Patented Mar. 11, 1913.

Application filed April 11, 1911. Serial No. 620,377.

*To all whom it may concern:*

Be it known that I, WILBUR W. ELLIS, a citizen of the United States, residing at Washington Court House, in the county of Fayette and State of Ohio, have invented new and useful Improvements in Sliding Vehicle-Doors, of which the following is a specification.

The invention relates to carriages and wagons, more particularly to sliding doors therefor, and has for an object to provide a sliding waterproof closure for vehicles.

In various types of vehicles, now in use, particularly in carriages and the like, the doors thereof are hingedly mounted so that the same will swing outwardly from the carriage when the doors are opened. By providing doors of this character, when the doors are moved to open position in wet weather, the inner sides of the doors tend to become damp and wet and when it is desired to close the door from the inside of the carriage, the operator must lean far out over the step of the carriage to grasp the door and move the same to closed position. In inclement weather this manner of closing the carriage door is particularly discomforting to the operator or passenger, for in the act of closing the door the passenger is subjected to the inclemencies of the weather. Furthermore when the doors are mounted on carriages as mentioned, they tend to engage the rear wheels of the carriage when in open position, thus scraping the varnish or lacquer therefrom and greatly destroying the outer finished surface of the door.

In my invention I aim to provide a device which is mounted to slide on the carriage so that by simply grasping a handle either inside or outside of the carriage, the closure can be slid relatively to the frame of the carriage and in this manner moved to either open or closed position. With a device of this kind it will be readily seen that the inside of the closure is not subjected to any inclement weather and the said closure can be operated by anyone either on the inside or the outside of the carriage or vehicle.

To accomplish the desired result, use is made of a runner secured to the frame of the vehicle exteriorly thereof and a plurality of relatively similar runners secured to the frame of the vehicle interiorly thereof, a closure mounted to slide on the said runners and movable longitudinally to the frame of the carriage, the said closure having a waterproof construction and shaped to aline with the outer sides of the carriage when the closure is in closed position.

Reference is to be had to the accompanying drawings constituting a part of this specification, in which similar characters of reference denote corresponding parts in all the views, and in which—

Figure 2:
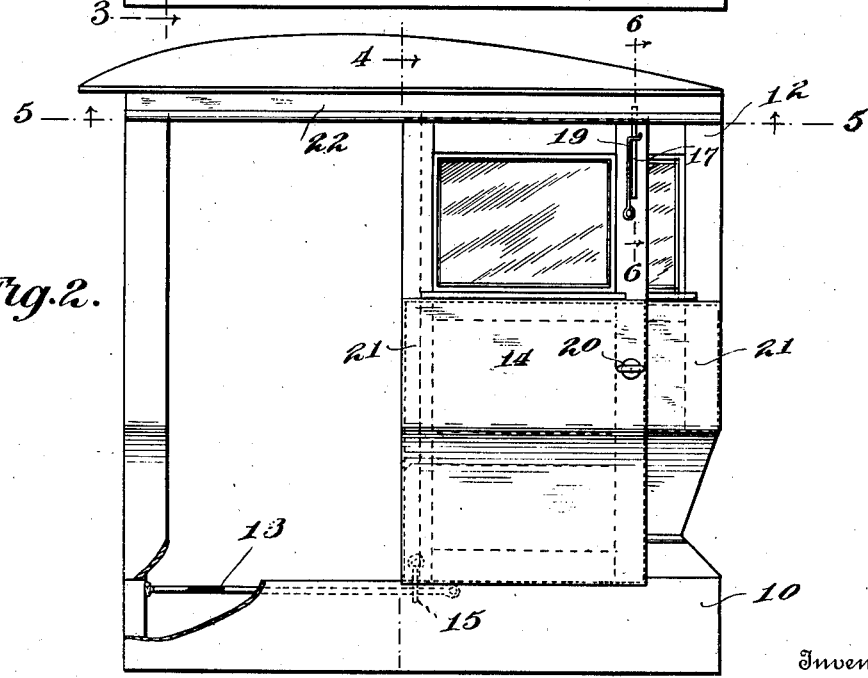

Figure 1 is a partial side elevation of a carriage showing my closure applied thereto and in closed position, parts being broken away to disclose the underlying structure. Fig. 2 is a similar side elevation showing my device in open position. Fig. 3 is a vertical sectional view taken on the line 3—3 in Fig. 1. Fig. 4 is a vertical section taken on the line 4—4 in Fig. 2. Fig. 5 is a horizontal section taken on the line 5—5 in Fig. 2. Fig. 6 is a fragmentary vertical section taken on the line 6—6 in Fig. 2 showing one of the slidable members of my door.

Referring more particularly to the various views a carriage 10 is provided having a runner 11 secured to the frame 12 of the carriage at the upper end thereof and exteriorly to the frame 12, the said runner having its ends connected to the frame of the carriage and the portion intermediate the ends spaced therefrom and extending longitudinally to the frame. Secured to the inner sides of the frame 12 are a plurality of similar runners 13, one of the runners being secured to the frame at the upper end thereof and over the door opening in the frame and the other runner 13 being secured at the lower end of the frame adjacent the lower end of the door opening thereof. The runners 13 have their ends connected to the frame in any suitable manner, one of the ends of each of the runners being substantially straight and the other end of each of the runners being preferably curved for a purpose that will be hereinafter more fully disclosed. Secured to the inner side of a closure 14 are a plurality of similar hangers 15, each of the hangers being provided with elongated apertures 16, through which are extended the runners 13, one of the hangers 15 slidably engaging the upper runner 13 and the other hanger 15 slidably engaging the lower runner 13.

Pivotally mounted on the closure 14 at the upper rear end thereof is a hanger 17 having an aperture therein through which is extended the runner 11 so that the said hanger can be slidably operated over the said runner, as will be seen in Figs. 1 and 2. A spring 19 is secured to the closure 14 and engages the upper end of the hanger 17.

Assuming that the closure or door 14 is in closed position, when it is desired to open the same, the usual handle 20 of the closure releasably locking the closure to the carriage frame is actuated to unlock the closure relatively to the frame thus moving one end of the closure outwardly from the frame by the action of the spring 19 in engagement with the hanger 17. The handle 20 is then grasped and the closure 14 can be moved to open position by sliding the same on the runners 11 and 13. To move the closure to closed position, the handle 20 is grasped and the closure is slid on the runners 11 and 13 to reassume its normal or closed position, the handle 20 being then turned to lock the closure relatively to the frame of the carriage. It will be noted that the outward swinging movement of the closure or door is very slight, as shown in Figs. 3 and 4, and by providing the elongated apertures 16, the door can be swung outwardly, as mentioned, without causing any binding between the hangers 15 and runners 13, it being further noted that the hangers 15 move into engagement with the bend in the runners 13 when the closure or door has been partially slid into open position.

Where a waterproof construction is desired so that no rain can enter the carriage, the side of the closure is preferably covered with a waterproof material 21 and a waterproofing strip 22 is secured to the upper end of the frame 12 and adjacent to the runner 11 so that the runner 11 will not be subjected to any wet weather and the hanger 17 will also be prevented from any inclement weather.

From the foregoing description it will be seen that by operating my door as described the inner side of the door will be at all times protected and the door cannot be engaged by the rear wheels of the carriage to mar the outer finished surface of the door. It will be understood that a suitable handle can be secured to the door or closure on the inner side thereof so that the same can be moved to closed or open position by the person or passenger seated inside the carriage.

Although for the purpose of describing my slidable closure I have shown a particular construction thereof it will be understood that various departures in the described construction can be made without departing from the spirit of the invention and the scope of the invention is defined in the appended claims.

Having thus fully described the invention, what I claim as new, is:—

1. A device of the class described comprising a vehicle frame, a runner secured to the said frame exteriorly thereof, a door, a hanger pivotally mounted on the said door and operable on the said runner, a spring engaging the said hanger, a plurality of curved runners secured to the said frame interiorly thereof and a plurality of hangers secured to the said door and slidably engaging the said curved runners, said hangers being spaced apart with one of the hangers engaging each of the said curved runners.

2. A device of the class described comprising a plurality of curved runners secured to the inner side of a vehicle frame, a door, a plurality of apertured hangers secured to the said door, the apertures in the said hangers being adapted to receive therethrough the said runners, an exteriorly disposed runner secured to the outer side of the same frame, a hanger pivotally mounted on the said door and slidably engaging the said runner, and a spring secured to the said door and engaging the said pivotally mounted hanger.

3. In a device of the class described the combination of a carriage top, a plurality of runners secured to the inner side of the said carriage top, one of the said runners being disposed at the upper end of the said top and the other runner being disposed at the lower end of the said top, each of the said runners having one of their ends bent to form an offset portion, the said carriage top having an entrance therein, a door for closing the entrance to the said carriage top, a plurality of hangers rigidly secured to the said door on the inner side thereof and slidably engaging the said runners, a runner secured to the outer side of the said carriage top, a hanger pivotally mounted on the said door and slidably engaging the exteriorly disposed runner, a spring for engagement with the said pivotally mounted hanger, and a handle on the said door for operating the said door to slide on the said runners.

In testimony whereof I affix my signature in presence of two witnesses.

WILBUR W. ELLIS.

Witnesses:
 WM. H. BLAIR,
 JOHN A. SMITH.